United States Patent [19]
Kajiyama et al.

[11] Patent Number: 6,167,014
[45] Date of Patent: Dec. 26, 2000

[54] DISC LOADING DEVICE FOR LOADING A CARTRIDGE CONTAINING THEREIN A DISC OR A DISC CARTRIDGE

[75] Inventors: Yoshihiro Kajiyama, Chiba; Akihisa Inatani, Kanagawa; Junichi Aramaki, Chiba, all of Japan

[73] Assignee: Sony Corporation, Tokyo, Japan

[21] Appl. No.: 08/329,616

[22] Filed: Oct. 26, 1994

Related U.S. Application Data

[63] Continuation of application No. 08/081,086, Jun. 22, 1993, abandoned.

[30] Foreign Application Priority Data

Jun. 23, 1992 [JP] Japan ..................................... 4-187305
Aug. 31, 1992 [JP] Japan ..................................... 4-255638

[51] Int. Cl.⁷ .................................................. G11B 17/04
[52] U.S. Cl. .......................................................... 369/75.2
[58] Field of Search .................................. 369/75.1–75.2, 369/77.1–77.2, 270, 258; 360/99.06, 99.12

[56] References Cited

U.S. PATENT DOCUMENTS

| | | | |
|---|---|---|---|
| 4,433,410 | 2/1984 | Siryj et al. | 369/77.2 |
| 5,043,963 | 8/1991 | Iwamoto | 369/75.2 |
| 5,054,015 | 10/1991 | Tsukihashi et al. | 369/258 |
| 5,105,414 | 4/1992 | Funabashi et al. | 369/75.2 |
| 5,109,372 | 4/1992 | Caspers et al. | 369/75.2 |
| 5,119,357 | 6/1992 | Tsuruta et al. | 369/75.2 |
| 5,124,854 | 6/1992 | Iyota et al. | 360/96.5 |
| 5,216,558 | 6/1993 | Griffith et al. | 360/99.12 |
| 5,299,185 | 3/1994 | Sakurai et al. | 369/75.2 |
| 5,301,177 | 4/1994 | Kumakura | 369/75.2 |

FOREIGN PATENT DOCUMENTS

| | | |
|---|---|---|
| 0 375 988 A1 | 7/1990 | European Pat. Off. . |
| 0 481 640 A1 | 4/1992 | European Pat. Off. . |
| 61-206961 | 9/1986 | Japan ..................................... 369/77.2 |
| 0233465 | 10/1986 | Japan ..................................... 369/77.2 |
| 61-233465 | 10/1986 | Japan ..................................... 369/77.2 |

OTHER PUBLICATIONS

Patent Abstracts of Japan, vol. 11, No. 72 (P–554), Mar. 5, 1987 & JP–A–61 233 465 (Canon Inc.), Oct. 17, 1986.
Patent Abstracts of Japan, vol. 14, No. 340 (P–1080), Jul. 23, 1990 & JP–A–02 116 071 (Sanyo Electric Co. Ltd.), Apr. 27, 1990.
Patent Abstracts of Japan, vol. 15, No. 360 (P–1250), Sep. 11, 1991 & JP–A–03 137 861 (Matsushita Electric Ind. Co. Ltd.), Jun. 12, 1991.
Patent Abstracts of Japan, vol. 11, No. 37 (P–543), Feb. 4, 1987 & JP–A–61 206 962 (Canon Inc.), Sep. 13, 1986.

*Primary Examiner*—Brian E. Miller
*Attorney, Agent, or Firm*—Limbach & Limbach LLP

[57] ABSTRACT

A disc loading device for loading discs of different diameters on a disc rotating driving device provided within a outer casing is disclosed. The discs are the recording media on which information signals are pre-recorded or are to be recorded. The disc loading device includes a supporting base provided with the disc rotating driving device for rotationally driving the discs, and a disc transporting tray for holding and transporting the discs. The disc transporting tray is arranged above the supporting base and is movable between a position in which it is drawn into an outer casing containing the supporting base and a position in which it is drawn out of the outer casing. The disc transporting tray includes a first positioning recess for holding and positioning the disc having a first diameter, a second positioning recess for holding and positioning the disc having a second diameter lesser than the first diameter, and a third positioning recess for holding and positioning the disc having a third diameter lesser than the second diameter to enable the three types of the discs having respective different diameters to be loaded selectively on the disc rotating driving device.

17 Claims, 11 Drawing Sheets

DISC LOADING DEVICE FOR LOADING A CARTRIDGE CONTAINING THEREIN A DISC OR A DISC CARTRIDGE

This is a continuation of application Ser. No. 08/081,086 filed on Jun. 22, 1993 now aband.

BACKGROUND OF THE INVENTION

1. Field of the Invention

This invention relates to a disc loading device applied to a disc recording and/or reproducing apparatus employing an optical disc or a magneto-optical disc as a recording medium. More particularly, it relates to a disc loading device in which the above disc may be loaded on a disc table constituting the disc rotating driving device by transporting a disc transporting tray carrying the disc thereon into and out of a main body of the disc loading device.

2. Description of Related Art

There has hitherto been proposed a recording and/or reproducing apparatus in which a disc for recording information signals, such as an optical disc or a magneto-optical disc, is employed as a recording medium.

As the disc employed for such disc recording and/or reproducing apparatus, those having diameters of 12, 8 and 6.4 cm, have been proposed. Above all, the replay-only optical disc and the re-recordable magneto-optical disc, each having the diameter of 6.4 cm, is constituted as a disc cartridge by being housed within a cartridge main member as a casing, and is handled and loaded in this state into the disc recording and/or reproducing apparatus.

Meanwhile, the replay-only optical disc, on which information signals are pre-recorded and which is employed only for reproducing the recorded information signals, comprises a disc molded of a transparent synthetic resin, and a reflective layer of a metallic material deposited on one of the major surfaces of the disc substrate. The major surface of the disc substrate is formed with a pattern of micro-sized projections and recesses, corresponding to the information signals, such as by injection molding.

The information signals, recorded by the micro-sized projections and recesses, may be read by radiating a light beam to the pattern from the opposite major surface of the disc substrate, and by detecting the volume of the light reflected from the pattern.

On the other hand, the re-recordable magneto-optical disc comprises a disc substrate of a transparent synthetic resin, and a signal recording layer of a magnetic material deposited on one of the major surfaces of the disc substrate. The information signals may be recorded on the magneto-optical disc by radiating a converged laser light beam and simultaneously applying an external magnetic field to a recording track formed on the signal recording layer. The laser light beam is radiated through the disc substrate from its opposite major surface, while the external magnetic field is impressed from the firstly mentioned major surface of the disc substrate. The portion of the signal recording layer irradiated with the laser light beam loses its coercivity by being heated to a temperature higher than the Curie temperature. While being cooled, the heated portion of the signal recording layer is magnetized along the direction of the impressed external magnetic field.

That is, the information signals may be recorded on the magneto-optical disc by modulating the intensity of the light beam or the direction of the external magnetic field in accordance with the information signals, for changing the direction of magnetization of the signal recording layer as the disc is continuously rotated.

There has also been proposed a compatible disc recording and/or reproducing apparatus adapted for being selectively used with the replay-only optical disc or the re-recordable magneto-optical disc each having the diameter of 6.4 cm. This type of the disc recording and/or reproducing apparatus comprises a disc rotating driving unit for chucking and rotating the loaded disc, a magnetic head for impressing an external magnetic field to the disc driven into rotation, and an optical pickup unit for converging a laser light beam and radiating the converged beam to the disc and for detecting the return beam reflected back from the disc.

Each of the replay-only optical disc and the re-recordable magneto-optical disc has a circular loading reference opening at its center and, on its opposite major surface irradiated with the light beam, a loading height reference surface for establishing the loading height position of the disc in respect to the disc rotating driving unit.

The disc rotating driving unit, provided within the disc recording and/or reproducing apparatus, comprises a disc table for setting the optical disc or the magneto-optical disc in position in both the horizonal and heightwise directions. The disc table comprises a disc setting section integrally mounted on a spindle shaft and supporting the loading height reference surface of the disc, and a centering member provided at the center of the disc setting side of the disc setting section. The centering member is designed as an annulus having an outer peripheral surface which is tapered towards the distal end and is movably supported in the axial direction of the spindle shaft. Besides, the centering member is biased towards the distal end of the spindle shaft such as by a coil spring. As the disc is set on the disc setting section, the centering member is intruded into the loading reference opening in the disc, while it has its tapered outer peripheral surface thrust against the force of the coil spring by the inner rim of the loading reference opening in the disc, so that the disc is loaded in position on the disc table, with its center in coincidence with the center of the spindle shaft.

The magnetic head and the optical pickup unit are arranged facing each other, with the disc set on the disc table in-between, and are interconnected by a connecting arm. The magnetic head and the optical pickup unit are fed in a timed relation relative to each other in the radial direction of the disc set on the disc table across its inner and outer rims by an optical pickup feed unit, not shown.

Meanwhile, the above-mentioned disc recording and/or reproducing apparatus is provided with a disc loading device for loading the disc on the disc table.

The disc loading device comprises a disc transporting tray for holding the disc in position and for feeding the disc into and out of the main body of the device. The disc transporting tray has a disc holding recess having a size corresponding to the disc size. The disc is received within the third recess so as to be set in position. When the disc transporting tray having the disc set thereon is introduced into the main body of the disc loading device, and the disc has reached a position in register with the disc table, the disc transporting tray and/or the disc table are moved in a direction of approaching each other for loading the disc in position on the disc table.

The disc transporting tray employed in the above-described disc loading device is disclosed for example in U.S. Pat. Nos. 4,773,057 and 5,043,963. The disc transporting tray disclosed therein includes a first positioning recess for positioning a first disc having a first diameter and a second positioning recess for positioning a second disc smaller in diameter than the first disc. That is, the conventional disc transporting tray permits two kinds of discs having different diameters to be selectively positioned and held therein.

However, the conventional disc transporting tray is designed to hold only the disc itself, while it is unable to hold a disc cartridge comprising a main body of the cartridge containing the disc therein in position. Thus the disc transporting tray cannot be applied to a disc recording and/or reproducing apparatus into which a disc contained within the cartridge main body is loaded as it remains contained in the cartridge main body.

OBJECTS AND SUMMARY OF THE INVENTION

It is an object of the present invention to provide a disc loading device which permits loading not only of the disc itself but also of a disc cartridge comprising a disc contained in a cartridge main body.

It is another object of the present invention to provide a disc loading device which permits loading of discs of different diameters and disc cartridges in position on the disc transporting tray.

It is yet another object of the present invention to provide a disc recording and/or reproducing apparatus capable of recording and/or reproducing information signals reliably by having discs of different diameters and disc cartridges loaded reliably on the disc rotating driving device.

The disc loading device according to the present invention comprises a supporting base having a disc rotating driving device for rotationally driving discs of different diameters as recording media on which information signals are to be recorded or pre-recorded, and a disc transporting tray for holding and transporting the disc. The disc transporting tray is arranged above the supporting base and is movable between a position in which it is drawn into an outer casing containing the supporting base therein and a position in which it is drawn out of the outer casing. The disc transporting tray of the disc loading device comprises a first positioning recess for holding and positioning the disc having a first diameter, a second positioning recess for holding and positioning the disc having a second diameter lesser than the first diameter, and a third positioning recess for holding and positioning the disc having a third diameter lesser than the second diameter.

The first positioning recess is formed in the upper surface of the disc transporting tray as a circle corresponding to the first diameter, the second positioning recess is formed in the bottom surface of the first positioning recess as a circle corresponding to the second diameter and the third positioning recess is formed in the bottom surface of the first positioning recess as a rectangle corresponding to the contour of a disc cartridge containing the disc having the third diameter.

The discs or the disc cartridges may be selectively received in position in the associated first, second or third positioning recesses formed in the disc transporting tray.

DETAILED DESCRIPTION OF PREFERRED EMBODIMENTS

A disc loading device according to the present invention is applied to a disc recording and/or reproducing apparatus employing a disc on which information signals are pre-recorded or are to be recorded, such as an optical disc or a magnet-optical disc, as a recording medium.

A variety of discs, employed interchangeably with the present disc recording and/or reproducing apparatus, are hereinafter explained in detail.

Figure 1:
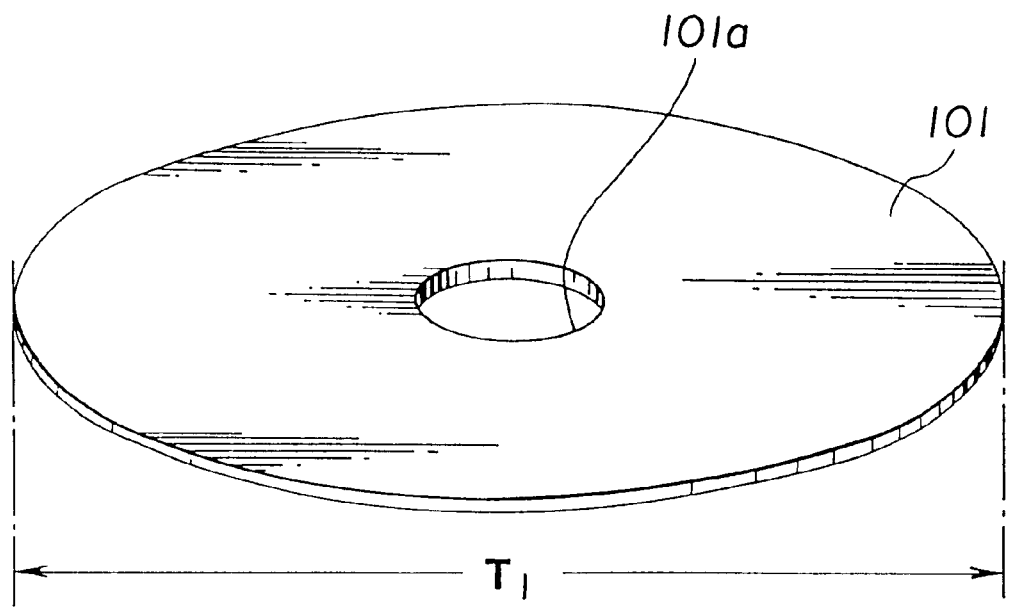
FIG. 1 is perspective view showing a first disc of a first diameter loaded by the disc loading device according to the present invention.

A first optical disc 101 has a diameter $T_1$ of 12 cm, as shown in FIG. 1. This optical disc 101 is designed as a replay-only disc, the disc substrate of which has its one major surface formed with a pattern of micro-sized projection and recesses as information signals. The central portion of the optical disc 101 is formed with a loading reference opening 101a for centering the disc 101 when loading the disc on a disc table.

Figure 2:
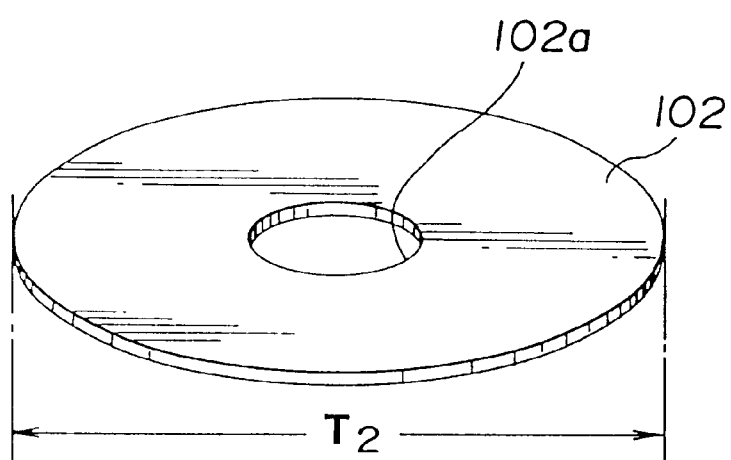
FIG. 2 is perspective view showing a second disc of a second diameter loaded by the disc loading device according to the present invention.
Figure 3:
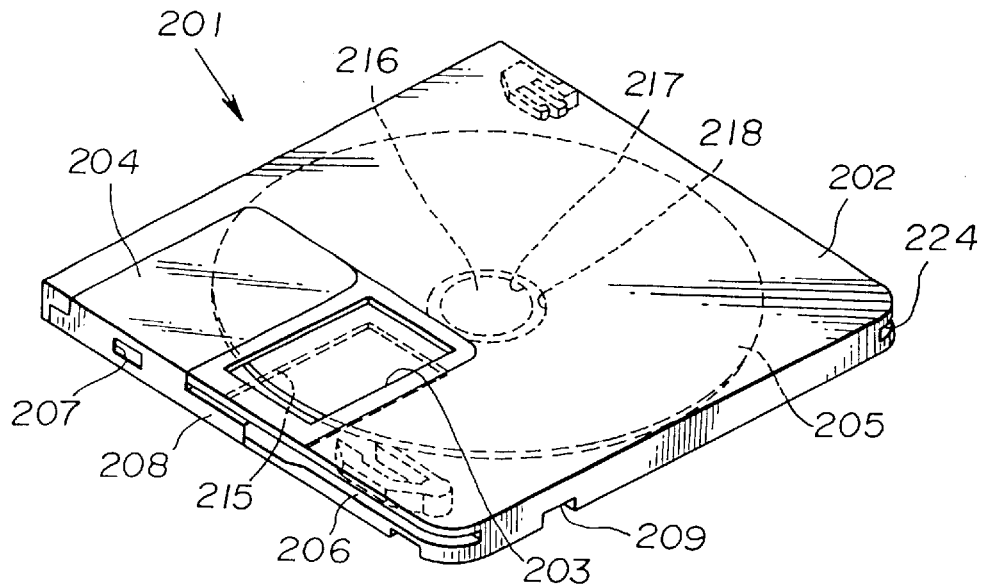
FIG. 3 is perspective view showing a disc cartridge having a magneto-optical disc of a third diameter therein and loaded by the disc loading device according to the present invention.
Figure 4:
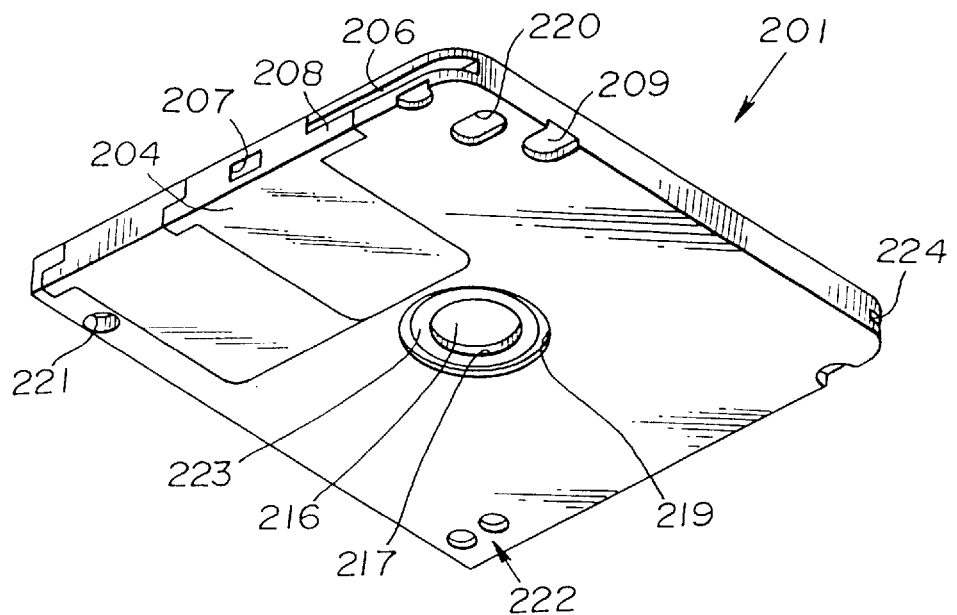
FIG. 4 is a perspective view, as seen from the bottom side, of the disc cartridge shown in FIG. 3.

A second optical disc 102 has a diameter $T_2$ equal to 8 cm, as shown in FIG. 2. Similarly to the first optical disc, this second optical disc 102 is designed as a replay-only disc on which information signals are previously recorded as a pattern of micro-sized projections and recesses and is formed with a central loading reference opening 102a.

There are also a magneto-optical disc 205 and a replay-only optical disc 214 which are of a smaller diameter (6.4 cm) than the first and second optical discs 101, 102. Of these, the magneto-optical disc permits re-recording of the information signals. As shown in FIGS. 3–6, the magneto-optical disc 205 and the optical disc 214, which are of a third diameter, are formed as disc cartridges 201, 211, by being contained in main cartridge members 202, 212, respectively. These discs 205, 214 are loaded on the disc recording/reproducing apparatus as they remain contained in the disc cartridge 201, 211.

The magneto-optical disc 205, which permits re-recording of information signals, has a magnetic recording medium applied to one of the major surface of the light-transmitting disc substrate of synthetic resin to form a signal recording layer. A reflective film of aluminum etc. is deposited on the signal recording layer and a protective layer of synthetic resin is additionally deposited on the reflective layer.

A clamping part is formed at the center of the magneto-optical disc 205 to permit the disc to be clamped in position in respect to the disc table. This clamping part comprises a loading reference opening 217 for assuring centering of the disc loaded on the disc table and a metallic plate 216 attached to the major surface of the disc substrate for closing the loading reference opening 217. This metallic plate 216, serving as an attractible member, is provided within a housing recess 218 formed on the major surface of the disc substrate for surrounding the loading reference opening 217, and is adapted for not being protruded out of the plane of the disc substrate major surface. The reference opening 217 is formed so that its center is coincident with the spirally extending recording track formed in the signal recording layer.

A positioning reference part 223, which has its end face used as a loading reference surface for setting the loading height of the disc relative to the disc table, is protuberantly formed on the opposite major surface of the magneto-optical disc 205.

The cartridge main member 202, housing the above-described magneto-optical disc 205 therein for constituting the first disc cartridge 201, comprises rectangular-shaped upper and lower halves. An aperture 203 for a magnetic head (not shown), permitting a part of the signal recording region of the magneto-optical disc 205, housed within the cartridge main member 202, to be exposed to outside across the inner and outer rims of the disc, is formed on one of the major surfaces of the cartridge main member. On the other hand, an aperture 215 for an optical pickup is formed on the other major surface of the cartridge main member 202 for facing the aperture 203 for the magnetic head. The aperture 215 for the optical pickup, plays the part of exposing a part of the signal recording region of the magneto-optical disc 205 to the outside across the inner and outer rims of the disc, similarly to the aperture 203 for the magnetic head, and is of substantially the same size as the aperture 203 for the magnetic head. The aperture 203 for the magnetic head and the aperture 215 for the optical pickup are each formed as a rectangular aperture extending from near the center of the cartridge main member 202 some distance along lateral sides thereof in turn extending at right angles to the lateral side by which the first disc cartridge 201 is introduced into the disc recording/reproducing apparatus. At a mid part of the opposite major surface of the cartridge main member 202, which is the surface of the cartridge main member 202 formed with the aperture 215 for the optical pickup, there is formed an opening 219 (clamp opening) for exposing the chucking part, inclusive of the positioning reference part 223 to outside.

The first disc cartridge 201 is provided with a shutter member 204 for opening or closing the aperture 203 for a magnetic head and the aperture 215 for an optical pickup opened in the major surface of the cartridge main member 202. This shutter member 204 is molded of synthetic resin formed by a thin metal sheet, in the shape of a letter U, and is slidably mounted on the cartridge main member 202 so that a pair of shutter plates thereof facing each other and having the respective proximal ends connected to each other via an integral connecting web are extended over the apertures 203, 215. The shutter member 204 is adapted for opening or closing the apertures 204, 215 by moving the shutter member 204 relative to the cartridge main member 202 in connection with the loading of the disc cartridge 201 on the disc recording/reproducing apparatus.

The replay-only third optical disc 214, equal in diameter to the magneto-optical disc 205 permitting re-recording of information signals, has information signals previously recorded in the form of pits (micro-sized projections and recesses) on one of the major surface of a disc substrate of light-transmitting synthetic resin. The formation of these pits, or the recording of the information signals, is carried out simultaneously with the molding of the disc substrate. The surface of the disc formed with the pits is provided with reflective surface of e.g. aluminum which in turn is provided with a protective film of synthetic resin.

Similarly to the magneto-optical disc 205, the optical disc 214 is provided with a chucking part, consisting of a loading reference opening 217 and a metallic plate 216 as an attractible member, and a positioning reference part 223. The loading reference opening 217 plays the part of centering the optical disc 214 as it is being loaded on the disc table. That is, the replay-only optical disc 214 has its outer profile identical with that of the magneto-optical disc 205 permitting re-recording of the information signals.

The second disc cartridge 211, having the replay-only third optical disc 214 contained therein, is comprised of a cartridge main member 212, made up of rectangular-shaped upper and lower halves connected to each other, and the optical disc 214 contained therein. The cartridge main member 212, having the optical disc 214 contained therein, has one of its major surface as a solid planar surface, and has its other major surface formed with a signal read-out aperture 215, which allows a part of a signal recording region of the optical disc 214 to be exposed to outside across its inner and out rims, and which is faced by this optical pickup device. The signal read-out aperture 215 is substantially rectangular in profile and extended from near the center of the cartridge main member 212 up to a lateral side thereof extending at right angles to the inserting side of the second disc cartridge 212 into the disc recording/reproducing apparatus. A chucking aperture 219 for exposing the chucking part inclusive of the positioning reference part 219 of the optical disc 214 to the outside is formed at the center of the aforementioned other major surface of the cartridge main member 212 formed with the signal read-out aperture 215.

Figure 5:
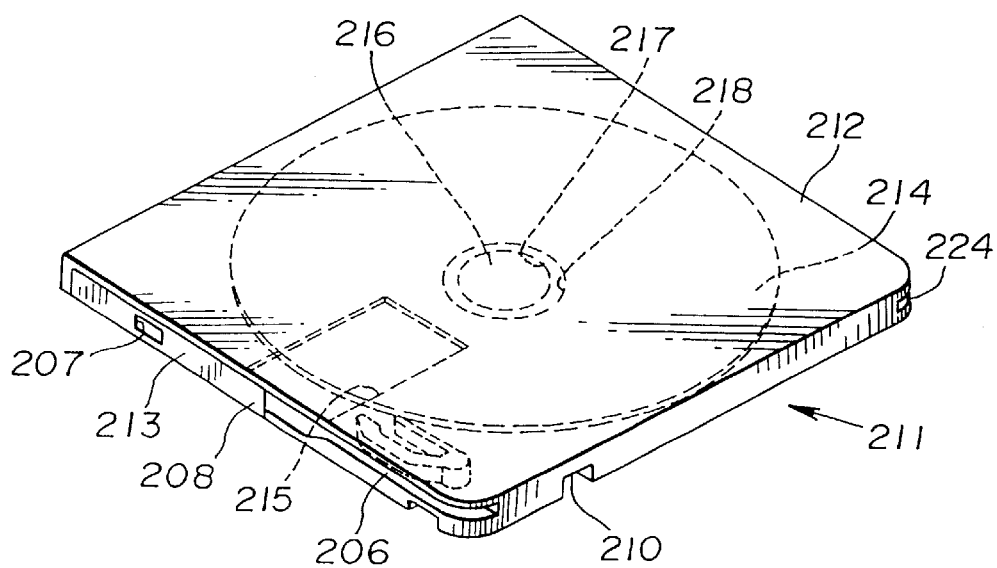
FIG. 5 is a perspective view showing a disc cartridge containing a replay-only optical disc of a third diameter therein.
Figure 6:
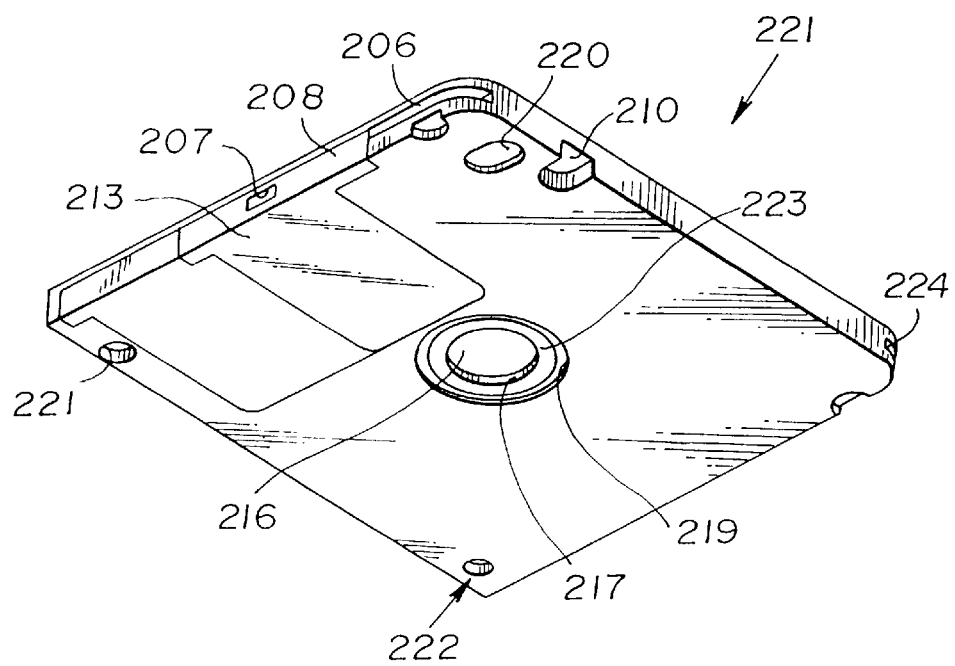
FIG. 6 is a perspective view, as seen from the bottom side, of the disc cartridge shown in FIG. 5.

The second disc cartridge 211, inclusive of the replay-only optical disc 214, is also provided with a shutter member 213 for opening or closing the signal read-out aperture 215. Since the second disc cartridge 211 has the aperture 215 only in its other major surface, the shutter member 213 is designed for opening or closing only the signal read-out aperture 215 formed in one major surface of the cartridge main member 212, in distinction from the shutter member 204 employed with the first disc cartridge 201. That is, as shown in FIGS. 5 and 6, the shutter member 213 is designed as a one-side shutter extended from a U-shaped slide guide part fitted to a lateral side of the cartridge main member 212 over the opposite side major surface of the cartridge main body 212 for opening or closing the signal read-out aperture 215.

The disc loading device according to the present invention for selectively loading the first or second disc cartridge 201, 211, having the above-described first optical disc 101, second optical disc 102 or a magneto-optical disc 205 or an optical disc 214 having a third diameter, is hereinafter explained in detail.

Figure 7:
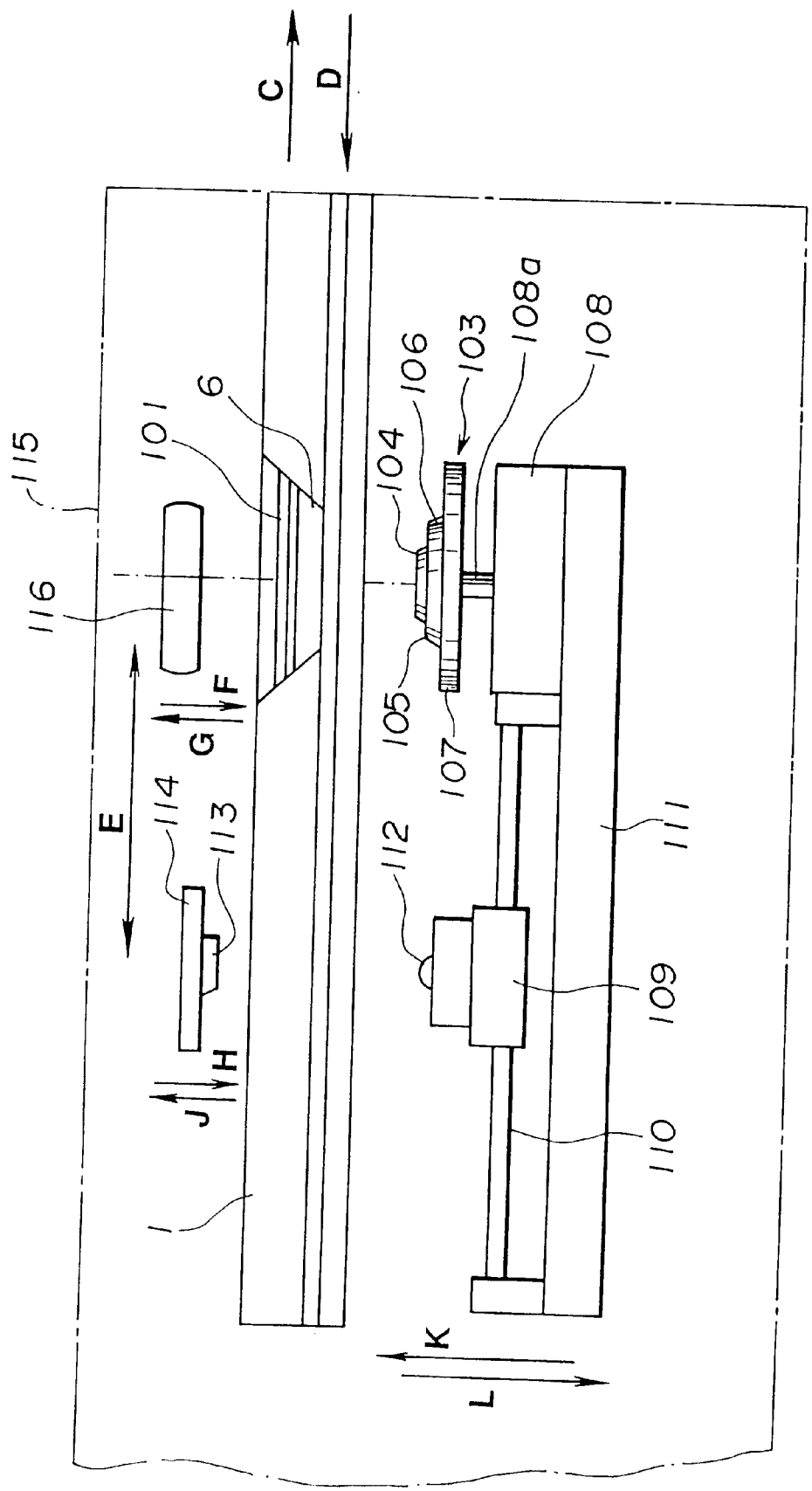
FIG. 7 is a schematic side view showing an arrangement of a disc recording and/or reproducing apparatus to which the disc loading device according to the present invention is applied.

Referring to FIG. 7, the disc loading device is made up of a supporting base 111 supporting a disc rotating driving unit 103 on which the optical discs 101, 102, magneto-optical disc 205 or the optical disc 214, having a third diameter, is selectively loaded and which runs the loaded disc into rotation, and a disc transporting tray member 1 positioned above the supporting base 111.

The disc rotating driving device and the optical pickup 109 are mounted on the supporting base 111 so that the optical pickup is movable radially of the disc which is run into rotation by the disc rotating driving device.

The disc rotating driving unit, provided on the supporting base 111 includes a spindle motor 108 secured to the supporting base 111, and a disc table 103 fitted to the distal end of a driving shaft 108a of the spindle motor 108 protruded above the supporting base 111. The disc table 103 is made up of a table section 107 for setting the first optical disc 101 or the second optical disc 102 thereon, a first centering member 106, which is fitted in the loading reference opening 101a, 102a of the first and second optical discs 101, 102 having first and second diameters, respectively, and on which is set the magneto-optical disc 205 or the third optical disc 214, each having the third diameter, and a second centering member 104 which is fitted into the loading reference opening 217 of the magneto-optical disc 205 or the third optical disc 214 having the third diameter. The first centering member 106 is formed on the upper surface of the table section 107 and the second centering member 104 is formed on the upper surface of the first centering member 106. The table section 107, formed e.g. of metal in the shape of a disc, has a central through-hole into which the driving shaft 108a has a press fit to cause the table section to be rotated in unison with the driving shaft 108a.

The optical pickup device 109, mounted via supporting base 111, is made up of an optical blocks and a series of optical devices, such as a light source, e.g. a semiconductor laser, photodetector and an object lens 112, provided within the optical block. The optical pickup device 109 causes a laser beam radiated from the light source to be converged via object lens 112 on one of the discs 101, 102, 205 or 214, loaded on the disc table 103, for recording and/or reproducing information signals on or from the disc 101, 102, 205 or 214.

Besides, the optical pickup device 109 is supported on the supporting base 111 for movement radially of the disc loaded on the disc table 103 by being guided by a guide shaft 110 mounted parallel to the plane of the supporting base 111. The optical pickup device 109 is moved, by driving means, not shown, in the radial direction of the disc loaded on disc table 103, that is in a direction towards and away from spindle motor 108 as shown by an arrow E in FIG. 7. Meanwhile, the optical pickup device 109, when mounted on the supporting base 111, has the optical axis of the object lens 112 extending parallel to the driving shaft 108a of the spindle motor 108.

Besides, the supporting base 111 may be lifted, as shown by arrows K and L in FIG. 7.

The disc transporting tray 1 is substantially in the shape of a flattened saucer and is disposed above and parallel to the supporting base 111, the disc transporting tray 1 is mounted for being moved between a position in which it is contained within the outer casing 115 and a position in which it is pulled out thereon as shown by arrows C and D in FIG. 7. The outer casing 115 contains means making up the disc recording and/or reproducing device, such as supporting base 111, and constitutes a main body of the disc recording and/or reproducing apparatus.

Meanwhile, a magnetic head device 113 and a disc chucking section 116 are provided within the outer casing 115 having the supporting base 111 housed therein, the magnetic head device 113, supported by a magnetic head supporting member 114, may be lifted as indicated by arrows H and J in FIG. 7. In addition, the magnetic head 113 is adapted to follow the movement of the optical pickup device 109 so as to be moved in a direction shown by arrow E in FIG. 7. When recording information signals on the magneto-optical disc 205 permitting re-recording of information signals, the magnetic head device 113 is used for applying an external magnetic field to the magneto-optical disc 205.

The disc chucking part 116 is disposed above the disc table 103, is adapted for being lifted in the directions shown by arrows F and G in FIG. 7. The disc chucking part 116 plays the part of thrusting the disc 101, 102, 205 or 214, set on the disc table 103, towards the disc table 103 for clamping the disc in cooperation with the disc table 103.

Figure 8:
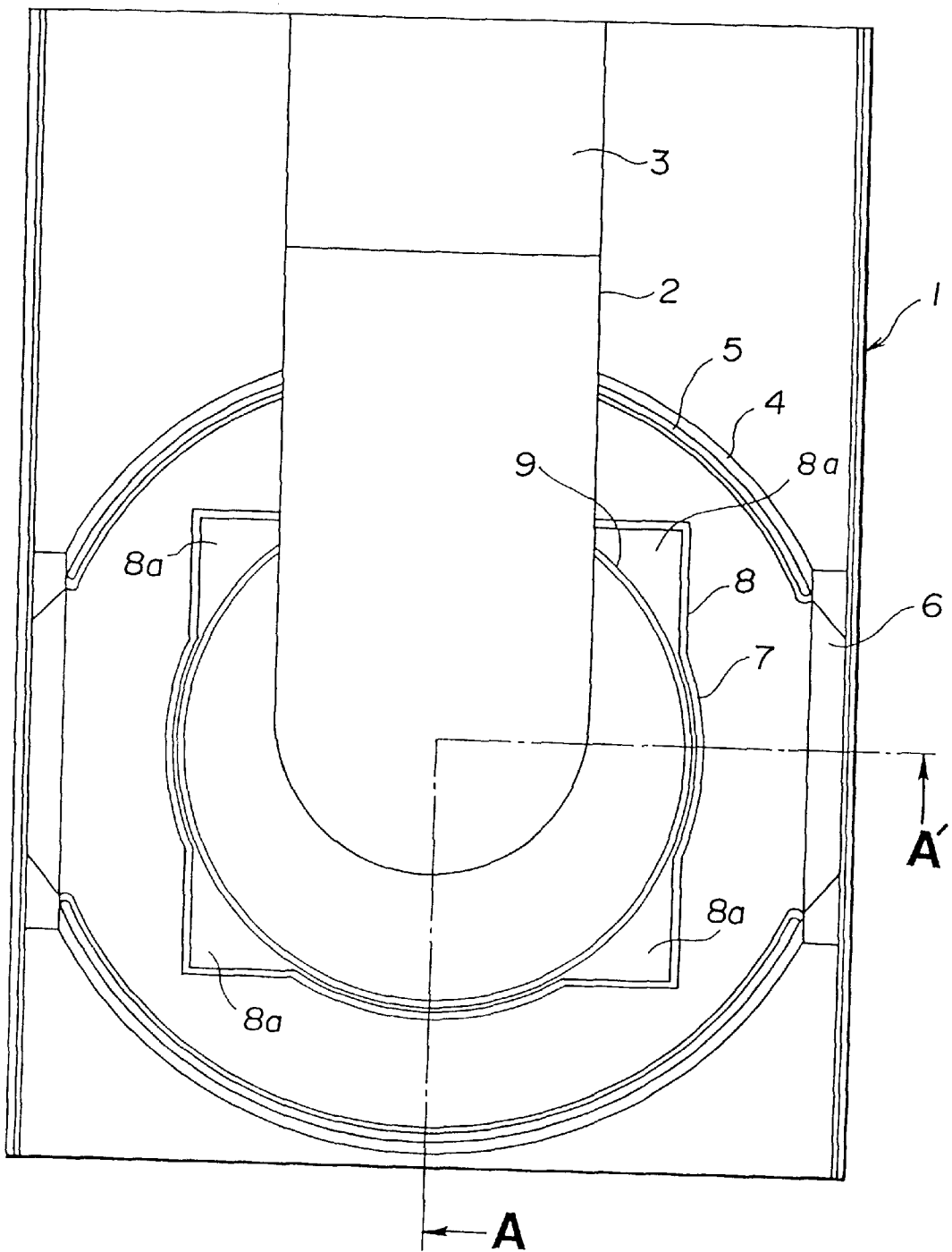
FIG. 8 is a plan view showing a disc transporting tray constituting the disc loading device according to the present invention.
Figure 9:
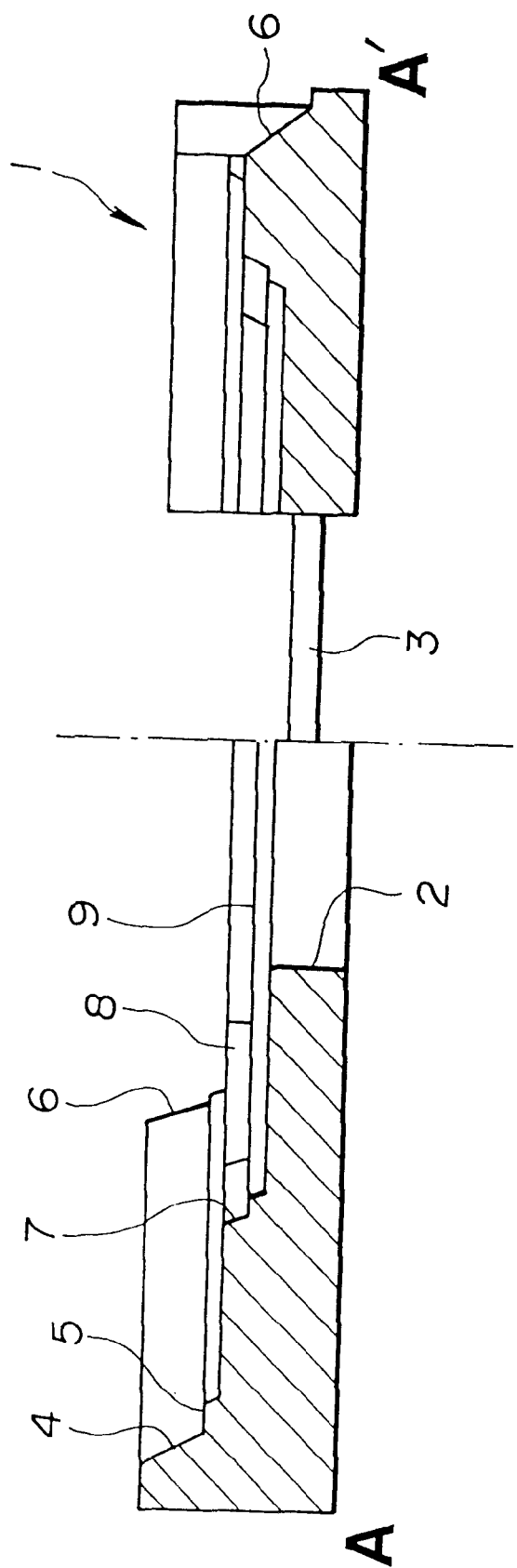
FIG. 9 is a longitudinal cross-sectional view of the disc transporting tray taken generally along the line A–A' in FIG. 8.

The disc transporting tray 1 has a first positioning recess 4 on its upper surface for positioning and holding the first disc 101, as shown in FIGS. 8 and 9. The first positioning recess 4 is a circular recess having a diameter corresponding to the diameter of the first optical disc 101 which is largest in diameter among the discs set on the disc transporting member. The outer rim of the bottom surface of the first positioning recess 4 is formed with a supporting rib 5 for supporting a non-recording region formed on the outer peripheral part of the first optical disc 101. A pair of finger inserting recesses 6, 6 communicating with the first positioning recess 4 are formed on both sides of the disc transporting tray 1. These finger inserting recesses 6, 6 are engaged by hands or fingers for facilitating the removal of the first optical disc 101 disposed within the first positioning recess 4.

The disc transporting member 1 is formed with a second positioning recess 7, which is stepped in respect to the bottom surface of the first positioning recess 4, for positioning and holding the second optical disc 102 having the second diameter. This second positioning recess 7 is formed as a circular recess, having a diameter corresponding to the radius of the second optical disc 102, concentrically with the first positioning recess 4. The outer rim of the bottom surface of the second positioning recess 7 is formed with a supporting shoulder 9 for supporting the non-recording outer rim region of the second optical disc 102.

The disc transporting tray 1 is also formed with a third positioning recess 8, for positioning and holding the first or second disc cartridge 201 or 211, as by partially cutting out the bottom surface of the first positioning recess 4. The third positioning recess 8 has its center coincident with the first positioning recess 4 and is formed substantially as a rectangle of the same size and shape as the first and second disc cartridges 201, 211. The third positioning recess 8, has a distance each of the four corners from its center which is larger than that in the case of the second positioning recess 7 and a distance at the lateral sides thereof smaller than that in the case of the second positioning recess 7. The second and third positioning recesses 7, 8 are of equal depths. Therefore, the ring-shaped supporting shoulder 9 is arcuately extended at the four corners 8a of the third positioning recess 8 from the second positioning recess 7.

The disc transporting tray 1 is also formed with a cut-out 2 extending from the center towards the rear for allowing the disc table 103 set on the supporting base 111 and the optical pickup device 109 to be exposed to the disc 101, 102, 205 or 206 set on the supporting base 111. A reduced thickness region 3 is provided at the back of the cut-out 2 to permit the disc transporting tray 1 to clear the optical pickup device 109 during movement of the disc transporting member 1.

Figure 10:
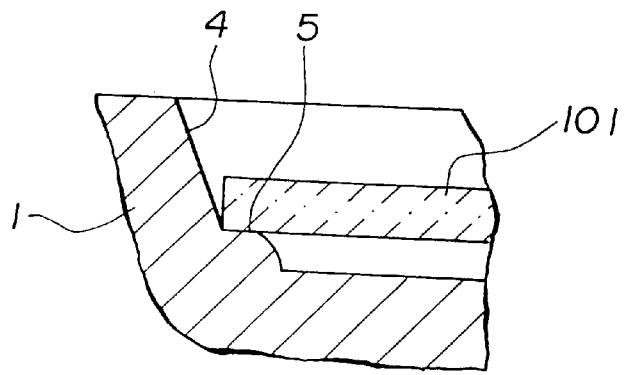
FIG. 10 is an enlarged fragmentary longitudinal cross-sectional view showing the disc of the first diameter set on the disc transporting tray shown in FIG. 8.

For loading the first optical disc 101 by the above-described disc loading device of the present invention, the disc transporting tray 1 is moved out of the outer casing 115 and the first optical disc 101 is placed into the first positioning recess 4 so as to be held therein. The first optical disc 101 thus placed in the first positioning recess 4 has its outer rim set on the supporting rib 5 so as to be positioned radially by the inner peripheral wall of the first positioning recess 4, as shown in FIG. 10.

When the disc transporting tray 1 is moved in this state within the outer casing 115, the first optical disc 101 is positioned with its loading reference opening 101a overlying the disc table 103. When the supporting base 111 is moved towards above for approaching the disc transporting tray 1, the first optical disc 101 is set in position on the disc table 103 by the loading reference opening 101 being engaged by the first centering member 106 of the disc table 103. The first optical disc 101 is clamped in position between the disc chucking part 116 and the disc table 103. At this time, the first optical disc 101 is spaced apart from the bottom surface of the first positioning recess 4 so as to be rotated without being contacted with the disc transporting tray 1.

If the spindle motor 108 is run at this time into rotation, the first optical disc 101 is rotated in unison with disc table 103 to permit information signals to be read by the optical pickup device 109.

If the supporting base 111 is caused to descend away from the disc transporting member 1, the first optical disc 101 is set on the disc transporting tray 1. As the disc transporting tray 1 is moved out of the outer casing 115, the disc 101 may be taken out of the outer casing 115.

Figure 11:
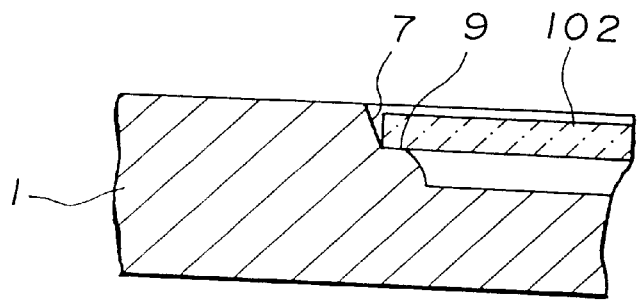
FIG. 11 is a fragmentary longitudinal cross-sectional view showing the disc of the second diameter set on the disc transporting tray shown in FIG. 8.

For loading the second optical disc 102 on the disc loading device, the disc transporting tray 1 is moved out of the outer casing 115. The second optical disc 102 is placed into the second positioning recess 7 so as to be held therein. The second optical disc 102, thus placed into the second positioning recess 7, is radially positioned by the inner peripheral wall of the second positioning recess 7, by having its outer peripheral rim set on the supporting shoulder 9, as shown in FIG. 11.

When the disc transporting tray 1 is moved in this state into the outer casing 115, the second optical disc 102 is positioned with its loading reference opening 102a overlying the disc table 103. When the supporting base 111 is moved upwardly in a direction towards the disc transporting tray 1, the second optical disc 102 is set in position on the disc table 103 by the loading reference opening 102a thereof being engaged by the first centering member 106 of the disc table 103. The second optical disc 102 is clamped in position between the disc chucking part 116 and the disc table 103. The first optical disc 101 is detached at this time from the bottom surface of the second positioning recess 7 so as to be rotatable without coming into physical contact with the disc transporting tray 1.

When the spindle motor is run into rotation at this time, the second optical disc 102 is rotated in unison with the disc table 103 to permit information signals to be read by the optical pickup device 109.

When the supporting base 111 is lowered in a direction away from the disc transporting tray 1, the second optical disc 102 is set on the disc transporting tray which is then moved out of the outer casing 115 to permit the disc 102 to be taken out of the outer casing 115.

Figure 12:
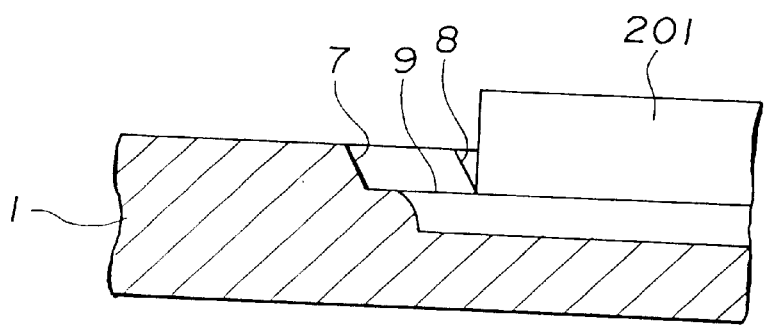
FIG. 12 is a fragmentary longitudinal cross-sectional view showing a disc cartridge containing a disc of a third diameter therein, set on the disc transporting tray shown in FIG. 8.

For loading the first or second disc cartridge 201 or 211 on the disc loading device, the disc transporting tray 1 is moved out of the outer casing 115 so that the disc cartridge 201 or 211 can be placed into the third positioning recess 8 so as to be held therein. That is, when the first or second disc cartridge 201 or 211 is loaded on the disc transporting tray 1, the disc cartridge 201 or 211 descends into the third positioning recess 8, as shown in FIG. 12, and has its four corners set on the supporting shoulder 9 so as to be positioned in the horizontal direction by the inner peripheral wall of the third positioning recess 8.

When the disc transporting member 1 is moved in this state within the outer casing 1, the magneto-optical disc 205 contained in the first disc cartridge 201 of the optical disc 214 contained in the second cartridge 201 is positioned with its loading reference opening 217 overlying the disc table 103. When the supporting base 111 is moved up in a direction of approaching the disc transporting tray 1, the magneto-optical disc 205 or the third optical disc 214 is set on the second centering member 104. At this time, the metallic plate 216 mounted on the magneto-optical disc 205 or the optical disc 214 is attracted towards the disc table 103 under the magnetic attraction exerted by a magnet, not shown, provided on disc table 103, so that the disc 205 or 214 is made fast with the disc table 103 in position.

If the spindle motor 108 is run into rotation, with the disc 205 or 214 made fast in position in respect to the disc table 103, the disc 205 or 214 is rotated in unison with disc table 103 to permit information signals to be recorded or reproduced with the aid of the optical pickup unit 109 and/or magnetic head. At this time, the disc table 103 is intruded into the cartridge main body 202 or 212 via chucking opening 219 formed in the cartridge main body 212 or 222. The shutter member 204 or 213 has been moved by shutter opening means, not shown provided on the disc recording/reproducing apparatus, during the time since the first or second disc cartridge 201 or 211 is set on disc transporting member 1 until the disc 205 or 214 is loaded in position on disc table 103, for opening the aperture 203 and/or aperture 215.

When the supporting base 111 is caused to descend in a direction away from the disc transporting tray 1, the first or second disc cartridge 201 or 211 is set on the disc transporting tray 1 and, by the disc transporting tray 1 being moved out of the outer casing 115, the disc cartridge 201 or 211 is enabled to be taken out of the outer casing 115.

Figure 13:
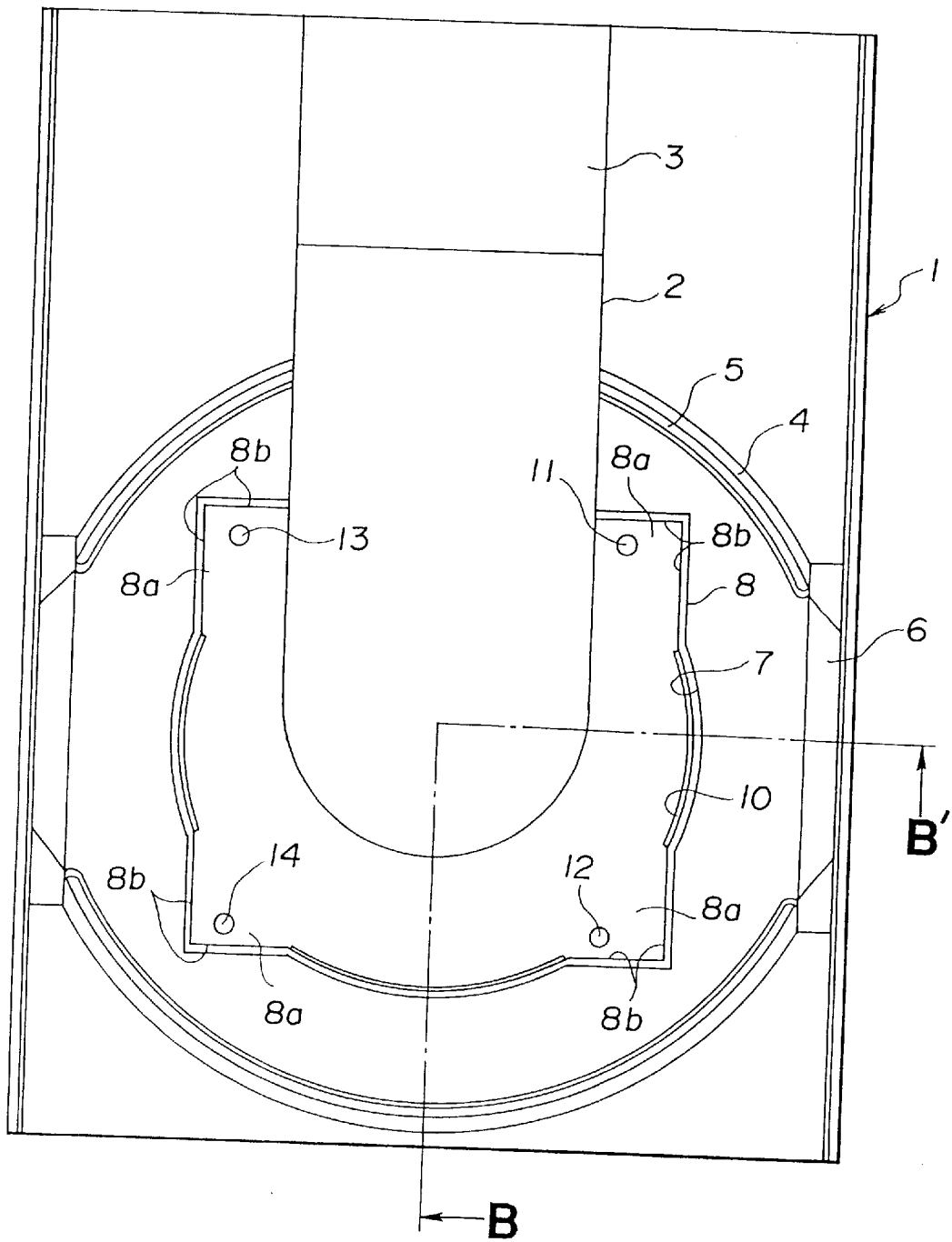
FIG. 13 is a plan view showing a modification of the disc transporting tray constituting the disc loading device according to the present invention.
Figure 14:
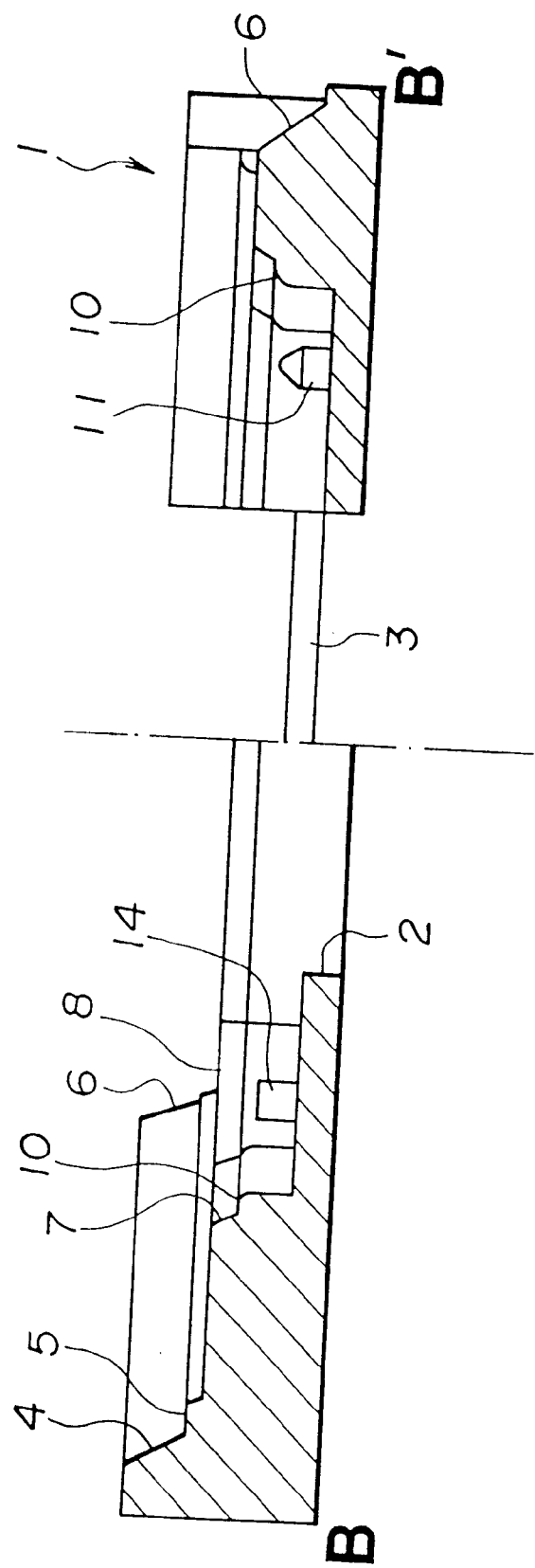
FIG. 14 is a longitudinal cross-sectional view of the disc transporting tray taken generally along the line B–B' in FIG. 13.

It is to be noted that the disc transporting tray 1 constituting the disc loading device according to the present invention is not limited to the above-described embodiments, but may comprise plural positioning pins 11, 12, 13 and 14 for positioning the first or second disc cartridge 201 or 211, as shown in FIGS. 13 and 14.

Similarly to the disc transporting tray 1 of the previous embodiments, the disc transporting tray 1 is formed substantially as a flattened saucer and is disposed above and parallel to the supporting base 111. The disc transporting tray 1 is movable between a position housed within the outer casing 115 and a position pulled out therefrom. The disc transporting tray 1 has on its upper surface the above-mentioned first positioning recess 4, second positioning recess 7 and the third positioning recess 8.

With the present disc transporting tray 1, the second and third positioning recesses 7 and 8 are of equal depth to each other, however, they are of a deeper depth than in the case of the disc transporting tray 1 of the previous embodiment. Also, the supporting shoulder 9 is not provided and, instead, a supporting rib 10 is formed only along the outer rim of the second positioning recess 2. The supporting rib 10 is formed only at the portion of the second positioning recess 7 extended outwardly of a side 8b of the third positioning recess 8, without being formed at the portion of the second positioning recess facing the four corners 8a of the third positioning recess 8.

The four positioning pins 11, 12, 13 and 14 are protuberantly formed at the four corners 8a of the third positioning recess 8. Two of these positioning pins 11 to 14 are tapered for being fitted into positioning holes 220, 221 formed in the first and second disc cartridges 201, 211, respectively, for positioning the disc cartridges 201, 211, respectively. The remaining two positioning pins are flattened at the distal end faces thereof for supporting the disc cartridges 201, 211 by being abutted against the lower surfaces of the disc cartridges 201, 211. These positioning pins 11 to 14 are of a lower height than the supporting rib 10 formed within the confines of the second positioning recess 7 so that the positioning pins are not abutted against the second optical disc 102 when the second optical disc is set on the supporting rib 10.

With the disc loading device, fitted with the above-described disc transporting tray 1, the optical discs 101, 102 or the disc cartridges 201, 211 may be satisfactorily positioned on the disc table 103 so as to be reliably loaded on the disc table 103.

Figure 15:
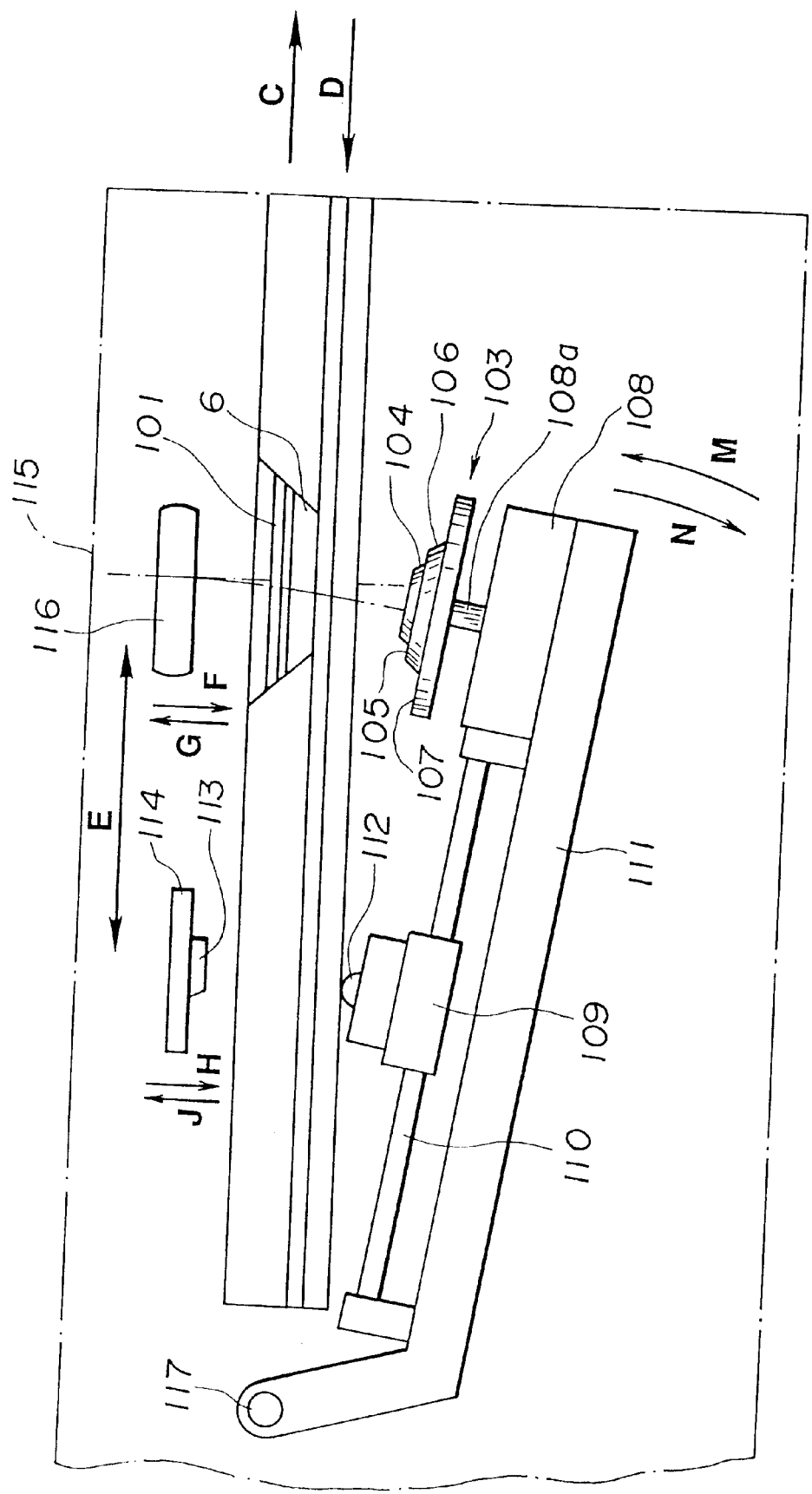
FIG. 15 is a side view showing a modification of the disc loading device according to the present invention.
Figure 16:
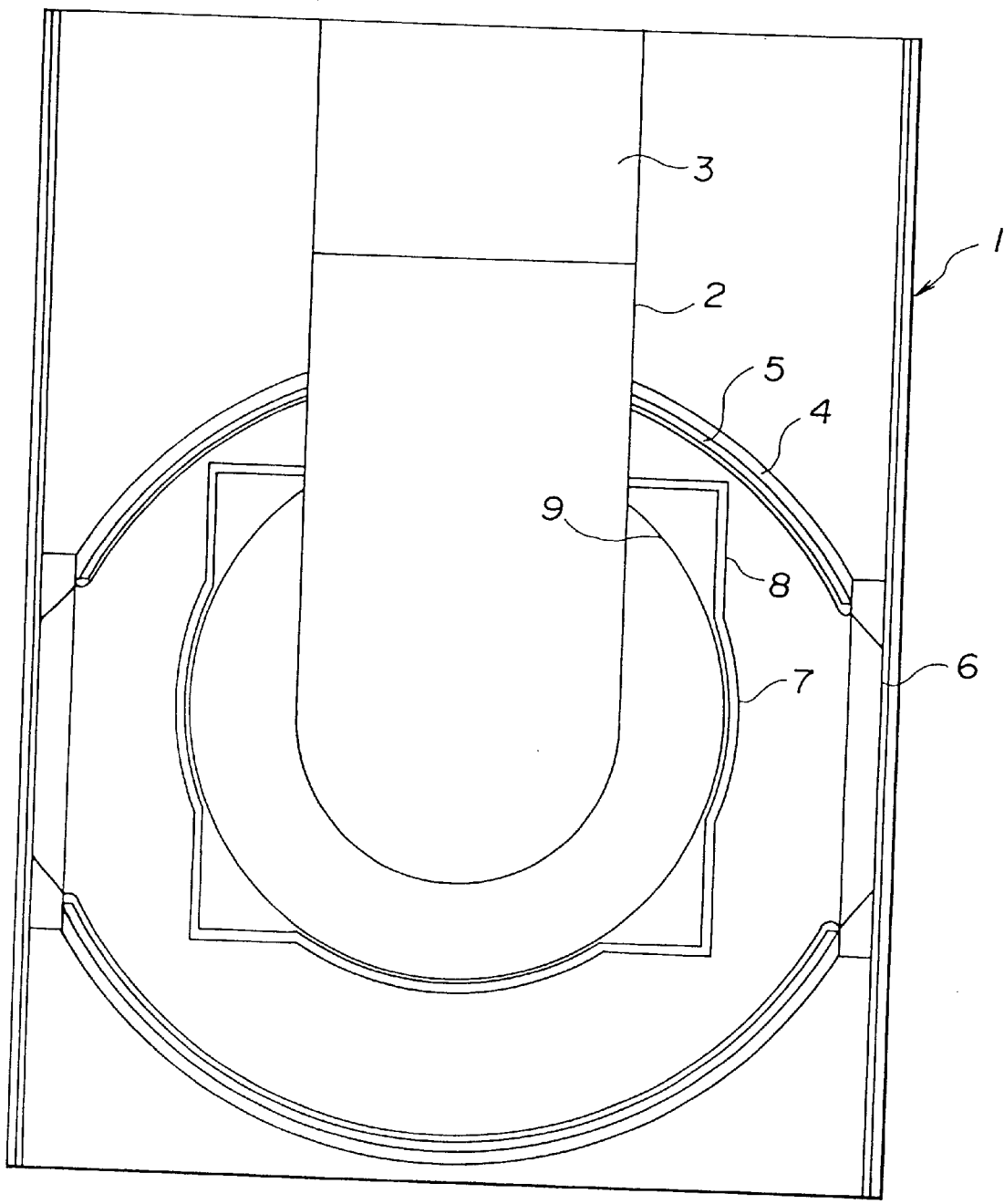
FIG. 16 is a plan view showing a disc transporting tray applied to the disc loading device shown in FIG. 15.

It is also to be noted that the supporting base 111 is not limited to the above-described constitution in which it is elevated or lowered in a horizontal position, as shown in the previous embodiment, but it may be supported for being rotated about a pivot 117, as shown in FIG. 15. In such case, the supporting base 111 is rotated about pivot 117 towards and away from the disc transporting tray 1 as shown by arrows M and N in FIG. 15. In such case, the first to third positioning recesses 4, 7 and 8 are not formed concentrically in respect to one another, but are formed so that the respective center points are each disposed on a locus of movement of the disc table 103 generated on rotation of the supporting base 111, as shown in FIGS. 15 and 16.

With this embodiment, the center points of the positioning recesses 4, 7 and 8 are offset along the direction of movement of the disc transporting tray 1 indicated by arrows C and D in FIG. 15.

With the above-described arrangement of the present invention, the optical discs 101, 102 and the disc cartridges 201, 211 may be satisfactorily positioned on the disc table 103 and, when the supporting base 111 is rotated upward in a direction of approaching the disc transporting tray 1, the discs 101, 102, 205 nd 214 are reliably positioned and loaded on the disc table 103.

What is claimed is:

1. A disc loading device comprising:
   a supporting base having a disc rotating driving unit for rotationally driving discs of different diameters as recording media on which information signals are to be recorded or are pre-recorded, and a disc transporting tray for holding and transporting said discs, said disc transporting tray being arranged above said supporting base and being movable between a position in which it is drawn into an outer casing containing said supporting base therein and a position in which it is drawn out of said outer casing,
   said disc transporting tray including:
   a first positioning recess for holding and positioning a first disc having a first diameter, said first positioning recess being formed in an upper surface of the disc transporting tray as a circle having a diameter corresponding to said first diameter, a second positioning recess for holding and positioning a second disc having a second diameter smaller than said first diameter, said second positioning recess being formed in a bottom surface of said first positioning recess as a circle having a diameter corresponding to said second diameter and a third positioning recess for holding and positioning a third disc having a third diameter smaller than said second diameter, said third positioning recess being formed as a rectangle corresponding to the contour of a disc cartridge containing said third disc having the third diameter.

2. The disc loading device as claimed in claim 1 wherein said third positioning recess is equal in depth to said second positioning recess.

3. The disc loading device as claimed in claim 1 wherein said first, second and third positioning recesses are concentric relative to each other.

4. The disc loading device as claimed in claim 1 wherein a supporting rib for supporting the first disc is provided at an outer periphery of the bottom surface of the first positioning recess by abutting on a non-recording region of said first disc, and wherein a supporting shoulder for supporting the second disc is provided at an outer periphery of the bottom surface of the second positioning recess by abutting on a non-recording region of said second disc.

5. The disc loading device as claimed in claim 4 wherein said supporting shoulder is formed from a position facing the non-recording region of the second disc loaded in position up to corners of said third positioning recess.

6. The disc loading device as claimed in claim 1 wherein a first supporting rib for supporting the first disc is provided at an outer periphery of the bottom surface of the first positioning recess by abutting on a non-recording region of said first disc, and wherein a second supporting rib for supporting the second disc is provided in a region extended outward from each lateral side of said third positioning recess at an outer periphery of the bottom surface of the second positioning recess by abutting on a non-recording region of said second disc.

7. The disc loading device as claimed in claim 6 wherein positioning pins are provided on the tray at two or more of the four corners of said third positioning recess for positioning said disc cartridge by being fitted in positioning holes formed in said disc cartridge.

8. The disc loading device as claimed in claim 7 wherein said positioning pins are lower in height than said second supporting rib.

9. The disc loading device as claimed in claim 1 wherein said first, second and the third positioning recesses are formed in the upper surface of said disc transporting tray so that the centers thereof are offset from each other along the direction of movement of said disc transporting tray.

10. The disc loading device as in claim 1, wherein said third positioning recess is formed in a bottom surface of said first positioning recess.

11. A recording and/or reproducing apparatus for a first disc-shaped recording medium and a second recording medium, smaller in diameter than the first recording medium and accommodated in a disc cartridge, said apparatus comprising:

a main body of the apparatus containing an optical pickup device and disc rotational driving means; and a tray formed with a first recess and a second recess and an opening for inserting said disc rotational driving apparatus and for irradiating a light beam on the disc from the optical pickup device, the tray being movably supported between a first position and a second position by the main body of the apparatus, the first recess and the second recess being accessible from outside of the main body when the tray is in the first position and the first recess and the second recess being contained inside of the main body when the tray is in the second position;

wherein the first recess is formed in a circular shape to receive the first disc shaped recording medium, the second recess is smaller in diameter than the first recess and is formed in a rectangular shape within the first recess to receive the cartridge and has positioning means for engaging the disc cartridge, the first recess is formed coaxially with the second recess, and the opening is formed to extend from a central position of the first recess and the second recess to an outer peripheral edge of the first recess.

12. A recording and/or reproducing apparatus according to claim 11, wherein the positioning means comprise a plurality of pins to engage the disc cartridge.

13. A recording and/or reproducing apparatus according to claim 11, wherein the tray further comprises a third recess formed coaxially with the first recess and the second recess, the third recess having a diameter which is smaller than the diameter of the first recess.

14. A disc reproducing and/or recording apparatus, comprising:

a main body;

an optical pickup device within the main body; and a supporting base within the main body having a disc rotating driving unit for rotationally driving one of a first disc-shaped recording medium which is not accommodated within a disc cartridge and a second, smaller disc-shaped recording medium which is accommodated within a disc cartridge as recording media on which information signals are to be recorded or are pre-recorded; and a disc transporting tray for holding and transporting said discs, said disc transporting tray being arranged above said supporting base and being movable between a position within the main body and a position outside of the main body, said disc transporting tray including:

a circular first positioning recess for holding and positioning the first disc, said first positioning recess being formed in an upper surface of the disc transporting tray as a circle having a diameter corresponding to said first disc, a rectangular, second positioning recess formed within the first positioning recess and which is smaller in diameter than the first positioning recess, for holding and positioning the disc cartridge, and positioning means for engaging the disc cartridge.

15. The recording and/or reproducing apparatus as in claim 14, wherein the positioning means comprises a plurality of pins that engage corresponding recesses in the disc cartridge.

16. A disc recording and/or reproducing apparatus as recited in claim 14, wherein the tray further comprises:

a third positioning recess for holding and positioning a disc having a second diameter less than the diameter of the first recess, said third positioning recess being formed in a bottom surface of said first positioning recess as a circle having a diameter corresponding to said second diameter; and wherein the second positioning recess is dimensioned to hold a disc having a third diameter less than said second diameter.

17. A disc loading device as in claim 16, wherein said third positioning recess is formed in said second recess positioning recess.

* * * * *